(12) United States Patent
Houghtaling

(10) Patent No.: US 9,034,134 B2
(45) Date of Patent: May 19, 2015

(54) MANUFACTURABILITY OF EPTFE LAMINATED MEMBRANES

(71) Applicant: GM Global Technology Operations LLC, Detroit, MI (US)

(72) Inventor: Bradley M. Houghtaling, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 164 days.

(21) Appl. No.: 13/833,368

(22) Filed: Mar. 15, 2013

(65) Prior Publication Data

US 2014/0261983 A1  Sep. 18, 2014

(51) Int. Cl.
*H01M 6/00* (2006.01)
*H01M 4/88* (2006.01)

(52) U.S. Cl.
CPC .................... *H01M 4/8878* (2013.01)

(58) Field of Classification Search
CPC ......................................... H01M 6/00
USPC ......................................... 156/182
See application file for complete search history.

(56) References Cited

U.S. PATENT DOCUMENTS

| 6,855,178 | B2 | 2/2005 | Uchida et al. | |
|---|---|---|---|---|
| 2007/0087245 | A1* | 4/2007 | Fuller et al. | 429/33 |
| 2007/0213203 | A1* | 9/2007 | Sompalli et al. | 502/101 |

* cited by examiner

*Primary Examiner* — Daniel Lee
(74) *Attorney, Agent, or Firm* — Dinsmore & Shohl LLP

(57) ABSTRACT

Methods for manufacturing laminated membranes for MEAs, such methods comprising (i) providing a substrate, a catalyst ink fluid, and a first membrane fluid; (ii) providing a second membrane fluid; (iii) simultaneously coating the catalyst ink fluid onto the substrate, the first membrane fluid onto the catalyst ink fluid, and the second membrane fluid onto the first membrane fluid; and (iv) applying a reinforcement layer (such as ePTFE) and allowing for full imbibement. The second membrane fluid (i) consists of alcohol or (ii) is an alcohol-rich fluid comprising polymer electrolyte.

15 Claims, 6 Drawing Sheets

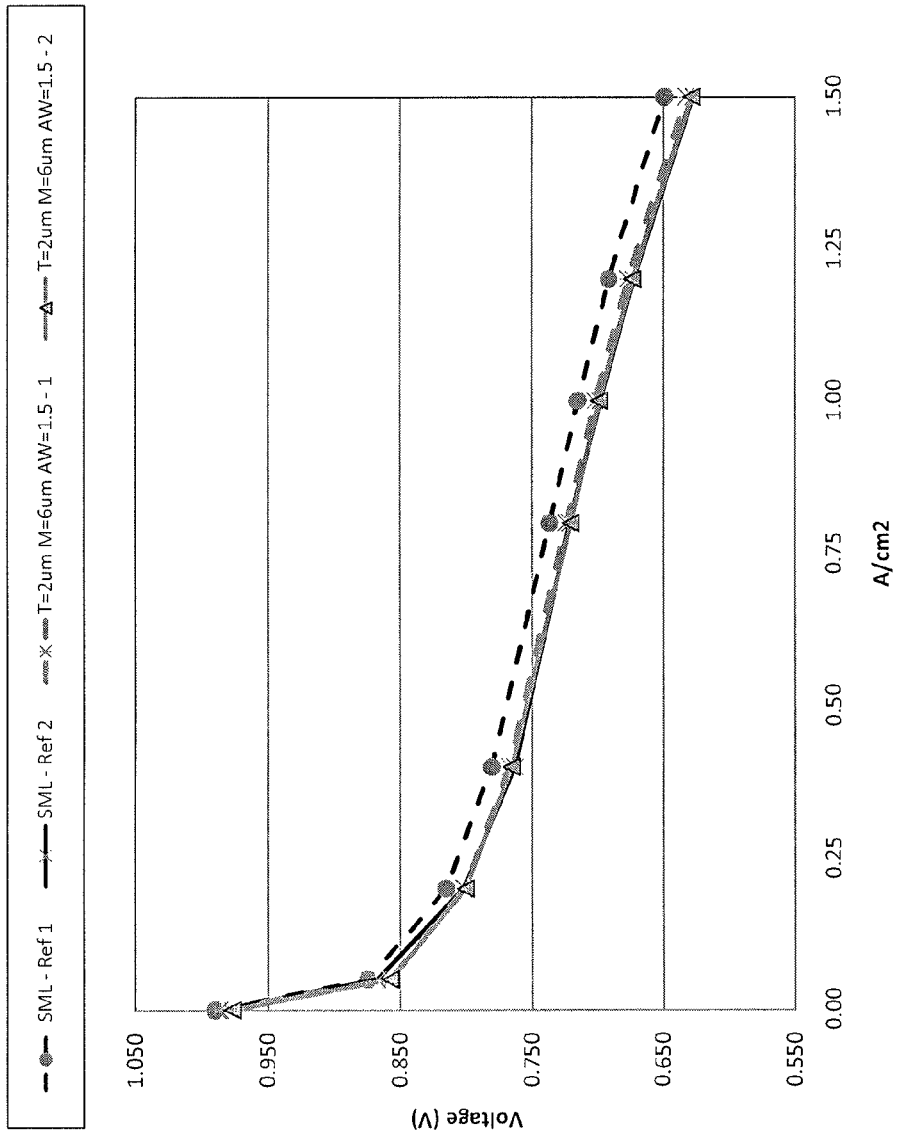

MANUFACTURABILITY OF EPTFE LAMINATED MEMBRANES

FIELD

The present disclosure relates generally to a process for coating a fuel cell component, and more particularly, it relates to improved processes for the manufacture of laminated membranes.

BACKGROUND

Electrochemical conversion cells, commonly referred to as fuel cells, produce electrical energy by processing reactants, for example, through the oxidation and reduction of hydrogen and oxygen. A polymer electrolyte fuel cell may comprise a polymer membrane [for example, a proton exchange membrane (PEM)] with catalyst electrode layers on both sides. The catalyst coated PEM may be positioned between a pair of gas diffusion media (GDM), and placed outside of the gas diffusion media layers are cathode and anode plates. Alternatively, catalyst coated diffusion media (DM) layers can be used.

There are many components of a membrane electrode assembly (MEA) that can be combined in layers, including an electrode ink layer, a microporous layer, and a membrane layer. During manufacture of a fuel cell, one or more of such layers can be coated successively on a support. More particularly, the layers can be combined using a sequential coating operation including partial or complete drying of one layer before the next layer is applied. The layers can also be made as independent layers (for example, formed on a sacrificial substrate) and later hot-pressed or otherwise bonded. For example, a microporous layer can be formed on a substrate; a catalyst layer coated on the microporous layer to fabricate an electrode; and then the formed electrode hot-pressed or otherwise bonded with a membrane support.

With conventional coating operations, the processes of manufacturing fuel cell components are complex, time-consuming, and costly, especially where the number of component layers is numerous and where there is duplication of coating and drying equipment. Thus, there remains a need for improved methods for manufacturing components of a membrane electrode assembly, and particularly methods that reduce processing steps and costs.

SUMMARY

In various embodiments, provided are improved methods for manufacturing fuel cell components, and more particularly, for manufacturing laminated membranes for membrane electrode assemblies. Such embodiments comprise (i) providing a substrate, a catalyst ink fluid and a first membrane fluid; (ii) providing a second membrane fluid; (iii) forming a wet composite structure by simultaneously coating the catalyst ink fluid onto the substrate, the first membrane fluid onto the catalyst ink fluid, and the second membrane fluid onto the first membrane fluid; and (iv) applying a reinforcement layer to the wet composite structure and allowing for full imbibement of the reinforcement layer. More particularly, diffusion at the second membrane fluid/first membrane fluid interface is such that at least some ionomer from the first membrane fluid is thought to diffuse through the second membrane fluid and into the reinforcement layer. In some of the embodiments, the methods are directed to the manufacture of expanded polytetrafluoroethylene (ePTFE)-laminated membranes, wherein the reinforcement layer is ePTFE.

In one example, the second membrane fluid consists of one or more alcohols, such as 1-4 carbon alcohols. The alcohol is disposed upon the first membrane fluid and the reinforcement layer is disposed upon the alcohol layer and full imbibement is allowed. In another example, the second membrane fluid is an alcohol-rich fluid also containing a polymer electrolyte. Such alcohol-rich fluid may, in some embodiments, have greater hydrophobicity than the first membrane fluid. In some embodiments, the alcohol-rich fluid may have lower viscosity than the first membrane fluid. In some embodiments, the alcohol-rich fluid may have greater hydrophobicity and lower viscosity than the first membrane fluid. The alcohol-rich fluid is disposed upon the first membrane fluid and a reinforcement layer is disposed upon the resulting multi-layer membrane structure (the top layer being alcohol-rich) and allowed to fully imbibe. In both examples, the rate of imbibement is surprisingly quick, thereby allowing for faster coating speeds and improved manufacturability of laminated membranes.

Regardless of the composition of the second membrane fluid, the provided methods may further comprise forming a dry composite structure by drying the reinforced wet composite structure. The dry composite structure so formed comprises a substrate, an electrode formed on the substrate, and a non-porous laminated membrane formed on the electrode.

In some of the various embodiments of the present disclosure, also provided are methods of manufacturing MEAs having laminated membranes (for example, ePTFE-laminated membranes). In one example of such methods, a cathode substrate can be formed by manufacturing a laminated membrane in accordance with the present disclosure, wherein the electrode comprises a cathode ink. The cathode substrate formed can then be assembled with an anode substrate to form a membrane electrode assembly. The anode substrate used can, but is not required to, comprise a laminated membrane manufactured in accordance with the present disclosure, wherein the electrode comprises an anode ink. In another example of the provided methods of manufacturing a membrane electrode assembly, an anode substrate can be formed by manufacturing a laminated membrane in accordance with the present disclosure, wherein the electrode comprises an anode ink. The anode substrate formed can then be assembled with a cathode substrate to form a membrane electrode assembly. The cathode substrate used can, but is not required to, comprise a laminated membrane manufactured in accordance with the present disclosure, wherein the electrode comprises a cathode ink.

Low equivalent weight perfluorosulfonic acid (PFSA) ionomers are known to offer an increase in voltage when used in a hydrogen powered fuel cell due to better proton conduction. Low equivalent weight ionomers are strongly hydrophilic due to the increased number of acid sites and are dispersible in hydrophilic solvents, such as low carbon alcohols and/or water. Reinforcing materials such as ePTFE are hydrophobic, and the rate of full imbibement of such materials into a conventionally coated membrane dispersion is exceedingly slow and therefore has associated process efficiency costs. An approach to overcome the problem of slow imbibement rate by introducing a more hydrophobic alcohol creates other problems, including a significant increase in viscosity, which slows imbibement rate. An approach to counteract high viscosity by making a significant dilution of the solution requires an increase in solvents, which leads to other process efficiency costs such as more solvents and longer drying time.

The provided methods enable use of a low solvent load while simultaneously increasing the imbibement rate and keeping the viscosity low. Thus, the provided methods enable increasing process efficiency.

BRIEF DESCRIPTION OF THE DRAWINGS

A more complete appreciation of the many embodiments of the present disclosure will be readily obtained as the same becomes better understood by reference to the following detailed description when considered in connection with the accompanying drawings, wherein.

DETAILED DESCRIPTION

Figure 1:
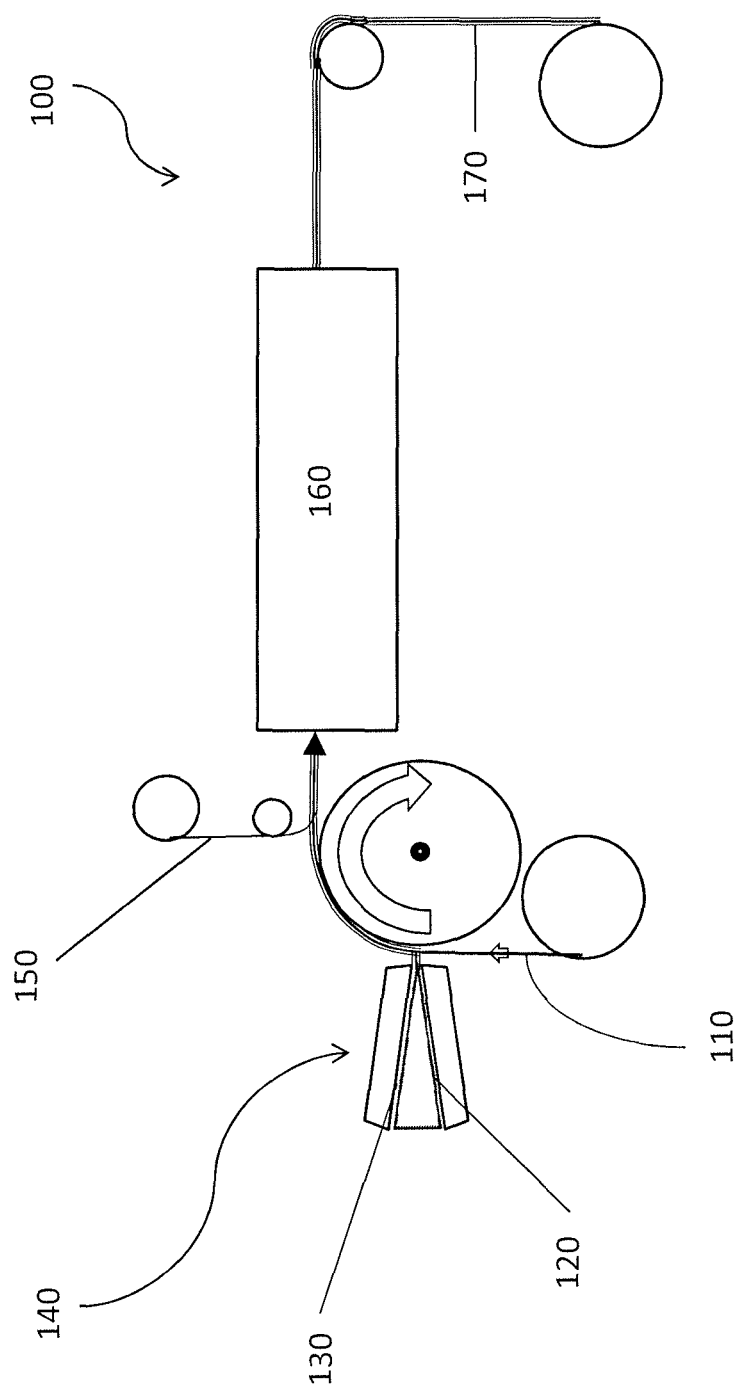
FIG. 1 depicts an exemplary 2-layer simultaneous coating method of a fuel cell component according to one or more embodiments shown and/or described herein.

Specific embodiments of the present disclosure will now be described. The invention may, however, be embodied in different forms and should not be construed as limited to the embodiments set forth herein. Rather, these embodiments are provided so that this disclosure will be thorough and complete and will fully convey the scope of the same to those skilled in the art.

Unless otherwise defined, all technical and scientific terms used herein have the same meaning as commonly understood by one of ordinary skill in the art to which this disclosure belongs. The terminology used in the present disclosure is for describing particular embodiments only and is not intended to be limiting. As used in the specification and appended claims, the singular forms "a," "an," and "the" are intended to include the plural forms as well, unless the context clearly indicates otherwise.

Recitations of "at least one" component, element, etc. in the present disclosure and appended claims should not be used to create an inference that the alternative use of the articles "a" or "an" should be limited to a single component, element, etc.

In the present disclosure and appended claims, recitations of a component being "configured" to embody a particular property, or function in a particular manner, are structural recitations, as opposed to recitations of intended use. More specifically, references to the manner in which a component is "configured" denotes an existing physical condition of the component and, as such, is to be taken as a definite recitation of the structural characteristics of the component.

As used in the present disclosure and appended claims, terms like "preferably," "commonly," and "typically" are not utilized to limit the scope of the claims or to imply that certain features are critical, essential, or even important to the structure or function of the claimed embodiments. Rather, these terms are merely intended to identify particular aspects of an embodiment of the present disclosure or to emphasize alternative or additional features that may or may not be utilized in a particular embodiment of the present disclosure.

The terms "substantially" and "approximately," as used in the present disclosure and appended claims, represent the inherent degree of uncertainty that may be attributed to any quantitative comparison, value, measurement, or other representation. Such terms are also utilized to represent the degree by which a quantitative representation may vary from a stated reference without resulting in a change in the basic function of the subject matter at issue.

As used herein, the term "fluid" is used to mean a pure fluid (such as a solvent), a solution, a dispersion, or an emulsion, depending upon the context of use.

Unless otherwise indicated, all numbers expressing quantities, properties, conditions, and so forth as used in the specification and claims are to be understood as being modified in all instances by the term "about." Additionally, the disclosure of any ranges in the specification and claims are to be understood as including the range itself and also anything subsumed therein, as well as endpoints. Notwithstanding that numerical ranges and parameters setting forth the broad scope of the disclosure are approximations, the numerical values set forth in the specific examples are reported as precisely as possible. Any numerical values, however, inherently contain certain errors necessarily resulting from error found in their respective measurements.

In various embodiments, the present disclosure provides improved methods for manufacturing coated fuel cell components, and more particularly laminated membranes for a MEA. Such embodiments comprise (i) providing a substrate, a catalyst ink fluid, and a first membrane fluid; (ii) providing a second membrane fluid; (iii) forming a wet composite structure by simultaneously coating the catalyst ink fluid onto the substrate, the first membrane fluid onto the catalyst ink fluid, and the second membrane fluid onto the first membrane fluid; and (iv) applying a reinforcement layer to the wet composite structure and allowing for full imbibement of the reinforcement layer.

Substrate

The provided methods of the present disclosure comprise providing a substrate upon which multiple layers may be coated. The coatable substrate may be a porous or non-porous substrate. Suitable substrates may include, but are not limited to, diffusion media (DM); gas diffusion media (GDM); and nonporous substrates, including (i) polymer films (examples include, but are not limited to, polyvinylidene fluoride, fluoroethylene propylene, polypropylene, polyimide, polyester, and polytetrafluoroethylene); (ii) polymer-coated paper (examples include, but are not limited to, polyurethane coated paper); (iii) silicone release paper, metal foil (for example, aluminum foil), metallic supports (for example, stainless steel support), and other nonporous materials.

DMs and GDMs may be carbon-based substrates, such as carbon paper, woven carbon fabric or cloths, non-woven carbon fiber webs, which are highly porous and provide the reaction gases with good access to the electrodes. Carbon-based substrates that may be useful in the practice of certain embodiments of the present disclosure include, but are not limited to, Toray™ carbon paper (Toray Industries, Inc.), SpectraCarb™ carbon paper (Spectracorp, Inc.), AFN™ non-woven carbon cloth, Zoltek™ carbon cloth (Zoltek Corp.), and Zoltek® PWB-3 (Zoltek Corp.). DMs and GDMs may also be treated with a hydrophobic component or microporous layer that permits removal of water from a fuel cell. The DMs and GDMs can be tailored specifically into anode-type GDMs or cathode-type GDMs, depending on into which side they are built in a given membrane electrode assembly.

In some examples, a porous substrate may have a thickness ranging from about 100-500 µm. Accordingly, porous substrates having a thickness of 100-150 µm, 150-200 µm, 200-250 µm, 250-300 µm, 300-350 µm, 350-400 µm, 400-450 µm, and 450-500 µm are specifically contemplated. In some examples, a non-porous substrate may have a thickness ranging from about 10-3200 µm. Accordingly, non-porous substrates having a thickness of 10-200 µm, 200-400 µm, 400-600 µm, 600-800 µm, 800-1000 µm, 1000-1200 µm, 1200-1400 µm, 1400-1600 µm, 1600-1800 µm, 1800-2000 µm, 2000-2200 µm, 2200-2400 µm, 2400-2600 µm, 2600-2800 µm, 2800-3000 µm, and 3000-3200 µm are specifically contemplated.

Catalyst Ink Fluid

The provided methods of the present disclosure further comprise coating the provided substrate with a catalyst ink fluid. In some embodiments, the electrode ink fluid comprises at least one catalyst, at least one solvent, and at least one ionomer. The electrode ink fluid may, in some embodiments, comprise at least one dispersing aid.

Where a substrate is porous, the substrate can provide a pathway for air to fill the electrode. However, when the substrate is non-porous, an obvious pathway for air infiltration of the electrode does not exist. It has been unexpectedly found that simultaneous coating of a catalyst ink layer and non-porous membrane fluid on a non-porous substrate results in a layer structure with an obvious pore structure in the electrode. Without being bound by theory, it is believed that dissolved air in the porous catalyst ink fluid is released during the drying step to form a porous electrode layer.

The catalyst ink fluid may be used to form a cathode layer or an anode layer, depending upon the catalyst(s) selected. The catalyst ink may be prepared by adding catalyst and milling media to a bottle, along with the solvent and ionomer to form a catalyst fluid. The catalyst fluid may then be milled by, for example, placing the bottle containing the catalyst fluid on a ball mill and rotating in the presence of milling media.

The catalyst is typically a finely divided precious metal having catalytic activity. Suitable precious metals include, but are not limited to, platinum, palladium, iridium, rhodium, ruthenium, and their alloys. Good results have been achieved with use of a platinum-alloy catalyst (Tanaka Kikinzoku International). In some examples, the catalyst used in the catalyst ink fluid may be catalyst metal coated onto the surface of an electrically conductive support. Generally, carbon-supported catalyst particles are used. Carbon-supported catalyst particles are about 50-90% carbon and about 10-50% catalyst metal by weight.

The solvent used in the catalyst ink fluid may be any suitable solvent, including but not limited to, water, methanol, ethanol, 1-propanol (n-propanol), 2-propanol (isopropyl alcohol), 1-butanol (n-butyl alcohol), 2-butanol (sec-butyl alcohol), 2-methyl-1-propanol (isobutyl alcohol), and 2-methyl-2-propanol (tert-butyl alcohol), water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethylhexan-2,5-diol, 3-hydroxy-3-methyl-2-butanone and 4-hydroxy-4-methyl-2-pentanone (diacetone alcohol) and mixtures thereof. Good results have been achieved with ethanol, water, and combinations thereof. The solvent may be present in the catalyst ink fluid in an amount of from 1 to 90% by weight (% wt), in some examples from 5 to 80% by weight, and in further examples from 10 to 50% by weight.

The catalyst ink fluid further comprises ionomer material (polymer electrolyte), which may or may not be the same ionomer material used a membrane fluid. Suitable ionomer materials include, but are not limited to, copolymers of tetrafluoroethylene and one or more fluorinated, acid-functional co-monomers, tetrafluoroethylene-fluorovinyl ether copolymer, perfluorosulfonic acids (PFSAs), perfluorocyclobutanes (PFCBs), hydrocarbon polymers, sulfonated polyether ketones, aryl ketones, acid-doped polybenzimidazoles, sulfonated polysulfone, sulfonated polystyrene, and mixtures thereof. Generally, the ionomer materials in the ink should be dissolved or dispersed in a suitable solvent. Many fluorine-containing ionomer materials can be obtained in the form of an aqueous solution in various concentrations. The ionomer content of the solution may range from 5 to 30% wt. Of course, ionomer materials supplied in the form of aqueous dispersions may also be used. Such dispersions may include, for example, Nafion® PFSA polymer (DuPont). As described in further detail below, the ionomer materials in the ink may be a low equivalent weight (EW) ionomer, a high EW ionomer or a blend of ionomer materials having a high EW and a low EW. Good results may be achieved with use of PFSA with and EW of from about 650-1100. By "equivalent weight" (EW) of a polymer, it is meant the weight of polymer required to neutralize one equivalent of base. In some examples, the fluid may comprise a blend of ionomers, each having a different EW.

As previously described, a catalyst is applied to the substrate in the form of a catalyst ink. The ink may contain 5-30% solids (ionomer and catalyst) and, in some examples, may contain 10-20% solids. The solids contained in the ink may have a particle size diameter ranging from about 0.01 µm to about 15 µm in some examples. In some examples, the solids contained in the ink may have a particle size distribution such that at least 80% of the solids have a particle size diameter ranging from about 0.01 µm to about 15 µm. In some examples, the solids contained in the ink may have a particle size distribution such that at least 80% of the solids have a particle size diameter ranging from about 0.01 µm to about 10 µm. In other examples, the solids contained in the ink may have a particle size distribution such that at least 90% of the solids have a particle size diameter ranging from about 0.01 µm to about 15 µm.

Other additives, such as binders, co-solvents, crack reducing agents, wetting agents, antifoaming agents, surfactants, anti-settling agents, preservatives, pore formers, leveling agents, stabilizers, pH modifiers, milling aids and other substances, can be used in the catalyst ink fluid to improve coatability. Furthermore, basic agents such as sodium hydroxide (NaOH) or potassium hydroxide (KOH) can be added for buffering of the acid groups of the ionomer.

In some examples, a crack reducing agent is added to a catalyst ink fluid. Electrodes made from catalyst ink can form a network of cracks on the surface, which is called "mud cracking." It is believed that "mud cracking" occurs due to the stresses that develop as wet film dries and the solid materials begin to consolidate. Not wishing to be bound by theory, the cracks may form due to stress gradients resulting from local thickness differences in the wet film. The cracks may also form following drying due to an inherent weakness of the electrode. If the tensile strength of the film is insufficient to overcome the induced drying stress, mud cracks can form to relieve the film of the stress. Thus, a crack reducing agent may be added to the catalyst electrode ink to prevent the formation of mud cracks. Examples of suitable crack reducing agents can include, but are not limited to, the addition of relatively high boiling solvents, for example, diacetone alcohol, carbon fibers, nanoclay platelets (for example available from Southern Clay Product of Gonzales, Tex.), or a mixture of low equivalent weight ionomers and high equivalent weight ionomers, or combinations thereof. Diacetone alcohol may be present in an amount up to about 30 wt % of a cathode ink. The carbon fibers may be about 10-20 um in length and 0.15 μm in diameter, and in some embodiments may be present in a ratio of about 1:6 (w/w) fibers:catalyst. Also, as disclosed above, the catalyst ink comprises ionomer material. Low equivalent weight (less than about 800 EW) ionomers or a mixture of low equivalent weight ionomers and high equivalent weight ionomers (greater than about 800 EW) may be used to mitigate the occurrence of mud cracks. In some examples, the ionomer material may be a mixture of ionomers having a high equivalent weight of greater than about 850 and a low equivalent weight of less than about 750.

First Membrane Fluid

The provided methods of the present disclosure further comprise providing, and coating the catalyst ink fluid with, a first membrane fluid. In some embodiments, the first membrane fluid comprises (i) at least one solvent selected from water, water-miscible organic solvent, and mixtures thereof; and (ii) at least one polymer electrolyte. The first membrane fluid is configured to provide, when coated and dried, a nonporous membrane layer.

The first membrane fluid comprises at least one ionomer (polymer electrolyte) suitable for use in an ion exchange membrane of a MEA. Examples of ionomers that may be useful in the provided methods include, but are not limited to, highly fluorinated, perfluorinated, fluorinated, and non-fluorinated (fluorine-free) polymers. Examples of fluorinated ionomers include copolymers of tetrafluoroethylene and one or more fluorinated, acid-functional co-monomers, tetrafluoroethylene-fluorovinyl ether copolymer, perfluorosulfonic acids (PFSAs), perfluorocyclobutanes (PFCBs), or mixtures thereof. Examples of fluorine-free polymers include hydrocarbon polymers, sulfonated polyether ketones, aryl ketones, acid-doped polybenzimidazoles, sulfonated polysulfone, and sulfonated polystyrene.

The ionomers used in the membrane fluid are typically dissolved or dispersed in a suitable solvent. Examples include, but are not limited to, water, methanol, ethanol, and propanol. Many fluorine-containing ionomer materials can be obtained in the form of an aqueous solution in various concentrations. The ionomer content of the solutions may range from 5 to 30% by weight of the solution. Ionomer materials supplied in the form of aqueous dispersions may also be used. Such dispersions may include, for example, Nafion® PFSA polymer dispersions (DuPont). Good results have been achieved with use of an ionomer dispersion comprising 20.4 wt % solids, 47.8 wt % water, and 31.8% ethanol.

The first membrane fluid may generally be coated onto the provided catalyst ink fluid such that the wet thickness of the first membrane layer ranges from about 25 μm to about 150 μm. In some examples, the first membrane layer formed by the process may have a dry thickness ranging from about 1 μm to about 30 μm. Accordingly, dry thicknesses of 1-3 μm, 3-6 μm, 6-9 μm, 9-12 μm, 12-15 μm, 15-18 μm, 18-21 μm, 21-24 μm, 24-27 μm, and 27-30 μm, are specifically contemplated. In some examples, the first membrane layer formed by the process may have a dry thickness of 1 μm-20 μm.

In some embodiments, the first membrane layer may have an equivalent weight (EW) of 1200 or less. Accordingly, equivalent weights of 1100 or less, 1000 or less, 900 or less, 800 or less, 700 or less, and 600 or less are specifically contemplated. Good results have been achieved with a 650 EW ionomer dispersion. In some examples, the fluid may comprise a blend of ionomers, each having a different EW.

In some embodiments, the first membrane layer may be annealed after a drying step to help obtain the necessary durability. Annealing can involve heating the membrane to a temperature above its glass transition temperature, then slowly cooling it down to form crystalline domains in an arrangement that imparts rigidity and strength to the membrane. In some examples, the membrane may be annealed at a temperature of 120° C. or higher, in other examples at 130° C. or higher, and in further examples at 150° C. or higher.

Ion-exchange membranes can degrade over time when subjected to the chemical environment found in a typical PEM fuel cell. One mechanism by which ion conducting polymer membranes may degrade is via loss of fluorine (fluoride emission) under open circuit voltage (OCV) and dry operating conditions at elevated temperatures. Another mechanism that may contribute to the degradation of an ion conducting polymer membranes by reaction with reactive species, such as hydrogen peroxide or hydroxyl radicals. To reduce membrane degradation, the use of chemical degradation mitigants may be required. Suitable chemical degradation mitigants that inhibit polymeric degradation may be selected from cerium-containing compounds, manganese-containing compounds, and a porphyrin-containing compound. In one example, the mitigant may be a platinum nanoparticle, $CeO_2$, or $MnO_2$. Other suitable examples may be soluble salts of sulfonate ($SO_4^{-2}$), carbonate ($CO_3^{-2}$) or nitrate ($NO_3^{-2}$) alone, or in combination. The salts may be of any of the following ions: $Co^{2+}$, $Co^{3+}$, $Fe^{2+}$, $Fe^{3+}$, $Mg^{1+}$, $Mg^{2+}$, $Mn^{1+}$, $Mn^{2+}$, $Mn^{3+}$, $Cl\,Mn^{3+}$, $HO\,Mn^{3+}$, $Cu^{1+}$, $Cu^{2+}$, $Ni^{1+}$, $Ni^{2+}$, $Pd^{1+}$, $Pd^{2+}$, $Ru^{1+}$, $Ru^{2+}$, $Ru^{4+}$, $Vn^{4+}$, $Zn^{1+}$, $Zn^{2+}$, $Al^{3+}$, $B$, $Si(OH)_2^{2+}$, $Al^{3+}$, $HOIn^{3+}$, $Pb^{2+}$, $Ag^+$, $Sn^{2+}$, $Sn^{4+}$, $Ti^{3+}$, $Ti^{4+}$, $VO^+$, $Pt^{2+}$, $Ce^{3+}$, and $Ce^{4+}$.

Second Membrane Fluid

The provided methods of the present disclosure further comprise providing, and coating the first membrane fluid with, a second membrane fluid.

In some embodiments, the second membrane fluid may consist of methanol, ethanol, 1-propanol, 2-propanol, 1-butanol, 2-butanol, 2-methyl-1-propanol, 2-methyl-2-propanol, and combinations thereof. Thus, in such embodiments, alcohol is layered upon the first membrane fluid and the reinforcement layer is disposed upon the alcohol layer, the alcohol layer unexpectedly providing relatively quick imbibement of the reinforcement layer (as compared to conventional membrane lamination methods). For example, 1-5× improvements in imbibement rate have been observed.

In other embodiments, the second membrane fluid has components similar to those of the first membrane fluid, but also has greater alcohol content (i.e., the second membrane fluid may be an alcohol-rich fluid) and lower solids. The second membrane fluid may also have greater hydrophobicity, lower viscosity, or both, as compared to the first membrane fluid. In such embodiments, the second membrane fluid is formulated to provide, when coated and dried, a second non-porous membrane layer. Accordingly, the second membrane fluid may comprise (i) at least one solvent selected from water, water-miscible organic solvent, and mixtures thereof; (ii) at least one polymer electrolyte; and (iii) at least one alcohol selected from methanol, ethanol, 1-propanol, 2-propanol, 1-butanol, 2-butanol, 2-methyl-1-propanol, and 2-methyl-2-propanol. Good results have been achieved with 1-propanol. The reinforcement layer is disposed upon a multi-layer membrane structure with the top layer being the alcohol-rich layer that unexpectedly provides relatively quick imbibement of the reinforcement layer (as compared to conventional membrane lamination methods).

In those embodiments wherein the second membrane fluid comprises at least one ionomer (polymer electrolyte), the ionomer selected must be suitable for use in an ion exchange membrane of a MEA and may be the same as, or different from, those selected for the first membrane fluid. In some examples, it may be desirable to have the same ionomer in the two layers in order to decrease contact resistance between the first and second layer, thereby increasing proton exchange between the two layers and thus improving fuel cell performance. However, in other examples, it may be desirable to have selection of ionomer for one membrane layer be independent of the selection of ionomer for the other layer.

Examples of ionomers that may be useful in the provided methods include, but are not limited to, highly fluorinated, perfluorinated, fluorinated, and non-fluorinated (fluorine-free) polymers. Examples of fluorinated polymer electrolytes include copolymers of tetrafluoroethylene and one or more fluorinated, acid-functional co-monomers, tetrafluoroethylene-fluorovinyl ether copolymer, perfluorosulfonic acids (PFSAs), perfluorocyclobutanes (PFCBs), or mixtures thereof. Examples of fluorine-free polymers include hydrocarbon polymers, sulfonated polyether ketones, aryl ketones, acid-doped polybenzimidazoles, sulfonated polysulfone, and sulfonated polystyrene.

The ionomers used in the membrane fluid are typically dissolved or dispersed in a suitable solvent. Examples include, but are not limited to, water, methanol, ethanol, and propanol. Many fluorine-containing ionomer materials can be obtained in the form of an aqueous solution in various concentrations. The ionomer content of the solutions may range from 5 to 30% by weight of the solution. Ionomer materials supplied in the form of aqueous dispersions may also be used. Such dispersions may include, for example, Nafion® PFSA polymer dispersions (DuPont). Good results have been achieved with use of an ionomer dispersion comprising 20.4 wt % solids, 47.8 wt % water, and 31.8% ethanol.

The second membrane fluid may generally be coated onto the provided first membrane fluid such that the wet thickness of the second membrane layer ranges from about 50 µm to about 260 µm. Accordingly, wet thicknesses of 50-65 µm, 65-80 µm, 80-95 µm, 95-110 µm, 110-125 µm, 125-140 µm, 140-155 µm, 155-170 µm, 170-185 µm, 185-200 µm, 200-215 µm, 215-230 µm, 230-245 µm, and 245-260 µm are specifically contemplated. In some embodiments, the second membrane layer formed by the process may have a dry thickness ranging from about 1 µm to about 50 µm; alternatively, from about 10 µm to about 30 µm.

The second membrane layer may, in some embodiments, have an equivalent weight (EW) of 1200 or less; alternatively, 1100 or less; alternatively, 1000 or less; alternatively, 900 or less; alternatively, 800 or less; alternatively, 700 or less; alternatively, 600 or less. Good results have been achieved with a 650 EW ionomer dispersion. In some examples, the membrane fluid may comprise a blend of ionomers, each having a different EW.

In some embodiments, the second membrane layer may be annealed after a drying step to help obtain the necessary durability. Annealing can involve heating the membrane to a temperature above its glass transition temperature, then slowly cooling it down to form crystalline domains in an arrangement that imparts rigidity and strength to the membrane. In some examples, the membrane may be annealed at a temperature of 120° C. or higher, in other examples at 130° C. or higher, and in further examples at 150° C. or higher.

To reduce membrane degradation, the second membrane fluid may comprise one or more chemical degradation mitigants in some embodiments. Suitable chemical degradation mitigants include, but are not limited to, cerium-containing compounds, manganese-containing compounds, porphyrin-containing compound; platinum nanoparticle; $CeO_2$; $MnO_2$; and soluble salts of sulfonate ($SO_4^{-2}$), carbonate ($CO_3^{-2}$) or nitrate ($NO_3^{-2}$). The salts may be of any of the following ions: $Co^{2+}$, $Co^{3+}$, $Fe^{2+}$, $Fe^{3+}$, $Mg^{1+}$, $Mg^{2+}$, $Mn^{1+}$, $Mn^{2+}$, $Mn^{3+}$, Cl $Mn^{3+}$, HO $Mn^{3+}$, $Cu^{1+}$, $Cu^{2+}$, $Ni^{1+}$, $Ni^{2+}$, $Pd^{1+}$, $Pd^{2+}$, $Ru^{1+}$, $Ru^{2+}$, $Ru^{4+}$, $Vn^{4+}$, $Zn^{1+}$, $Zn^{2+}$, $Al^{3+}$, B, $Si(OH)_2^{2+}$, $Al^{3+}$, $HOIn^{3+}$, $Pb^{2+}$, $Ag^+$, $Sn^{2+}$, $Sn^{4+}$, $Ti^{3+}$, $Ti^{4+}$, $VO^+$, $Pt^{2+}$, $Ce^{3+}$, and $Ce^{4+}$.

Wet Composite Structure

The provided methods of the present disclosure further comprise simultaneously coating the catalyst ink fluid, first membrane fluid, and second membrane fluid onto the substrate under laminar flow such that the catalyst ink fluid is coated onto the substrate, the first membrane fluid is coated onto the catalyst ink fluid, and the second membrane fluid is coated onto the first membrane fluid, thereby forming a wet composite structure. Application may be by a slot die coating process, slide coating process, curtain coating process, or combination thereof. In a slot die coating process, a coating die may be used that has two or more slots to permit passage of different coating fluids through each slot. In a slide coating process, simultaneous application of two or more coating fluid occurs using a slide hopper. A slide hopper forms a two or more liquid layer composite (i.e., one layer on top of another) that flows down a hopper slide surface, over a hopper lip surface, and onto the substrate. In a curtain coating process, liquid flows out of a slit and falls under gravity (called a curtain) onto a horizontally moving substrate. Similar to the slide coating process, a curtain may be a two or more liquid layer composite.

It has been surprisingly found that in using the processes disclosed herein, the provided fluids (catalyst ink fluid, first membrane fluid, second membrane fluid) may be simultaneously applied to a substrate while still maintaining a distinct layer relationship between the coatings after deposition. In addition, it has been surprisingly found that in simultaneously coating two or more fluids comprising solvents and small solid particles onto a substrate, two or more coating fluid layers may be simultaneously applied with no noticeable mixing or contamination at the interface of the layers. Without wishing to be bound by theory, it is believed that to obtain a distinct layer relationship in a simultaneous coating process, the coating fluids should be joined under laminar flow conditions. Accordingly, for simultaneous deposition of the provided fluids, the flow regime for each fluid layer is laminar in order to avoid layer mixing. Mixing of the first membrane fluid and catalyst ink fluids can lead to direct shorting of the cell since each electrode would be in intimate contact with the other in an MEA. The Reynolds number in the slot of a die is used to assess the degree of laminar flow. In some examples, the Reynolds number is less than about 2100 to maintain distinct layers. In other examples, the Reynolds number is less than about 50 to maintain distinct layers. In further examples, the Reynolds number is less than about 10 to maintain distinct layers. The Reynolds number is dimensionless, and may be calculated as follows:

$$Re = \rho * v * h / \mu$$

where $\rho$=fluid density, g/cm$_3$; $v$=fluid velocity, cm/sec; h=slot height, cm; and $\mu$=fluid viscosity, g/cm-sec.

In order to prevent significant diffusion between the fluid layers it may be necessary to vary the solvent ratios and/or solids concentrations of the fluid layers. For example, if the alcohol or water content is too high or too low in one layer relative to the other, then significant diffusion and/or mixing of the layers can result. Significant diffusion and/or mixing of the layers can also arise where the solids content in one layer is significantly different than in an adjacent layer. Diffusion between the layers can render the coating unstable, causing the layers to repel each other and/or cause unacceptably poor thickness uniformity. Where excessive diffusion occurs, component migration results where segments of one or more layers diffuse into one or more of the other layers in the coating structure. In general, component migration can influence performance and/or durability of an assembly of the membrane, electrodes, and diffusion media (and other components).

Regardless of how the various fluid layers are applied to the substrate, the provided methods comprise applying a reinforcement layer to the second membrane fluid and allowing for full imbibement of the reinforcement layer. In some examples, full imbibement may occur in 75 seconds or less; alternatively, 65 seconds or less; alternatively, 55 seconds or less; alternatively, 45 seconds or less; alternatively, 35 seconds or less; alternatively, 25 seconds or less; alternatively, 15 seconds or less. Good results have been achieved in 10-30 seconds.

The use of the reinforcement layer is to improve the mechanical strength of the membrane so that it is less susceptible to stress-related failures. Examples of suitable reinforcement layers include, but are not limited to, expanded polytetrafluoroethylene (ePTFE), metal screens, woven fabrics, and other suitable materials apparent to those of ordinary skill in the art. Good results have been achieved with use of ePTFE. In some examples, the electrode, membrane layer(s) and reinforcement layer may be annealed together. Annealing can involve heating the membrane to a temperature above its glass transition temperature, then slowly cooling it down to form crystalline domains in an arrangement that imparts rigidity and strength to the membrane. In some examples, the membrane may be annealed at a temperature of 120° C. or higher, in other examples at 130° C. or higher, and in further examples at 150° C. or higher. Annealing, if any, typically occurs prior to a drying step.

In some embodiments, the wet composite structure may further comprise a microporous layer, such layer being typical in fuel cells for wicking excess liquid water away from the cathode catalyst and diffusion layer interface and for providing performance improvement under wet operating conditions. Thus, in such embodiments, the provided methods further comprise providing a microporous fluid and disposing it a as a discrete layer to a face of a diffusion media substrate. The microporous layer fluid is generally a dispersion comprising various blends of carbon particles, hydrophobic polymers, and solvent. The term "carbon particles" is used to describe carbon in any finely divided form (the longest dimension of any of the particles is suitably less than 500 μm, preferably less than 300 μm, most preferably less than 50 μm) including carbon powders, carbon flakes, carbon nanofibers or microfibers, and particulate graphite. The carbon particles may be carbon black particles. Examples of suitable hydrophobic polymers may include polytetrafluoroethylene (PTFE), polyvinylidene fluoride (PVDF), fluoroethylene propylene (FEP), or other organic or inorganic hydrophobic polymer materials. The carbon particles and hydrophobic polymer may be dispersed in an organic solvent, water, and mixtures thereof. In some examples, the solvent may be selected from isopropyl alcohol, methanol, ethanol, n-propanol, n-butyl alcohol, sec-butyl alcohol, tert-butyl alcohol, water, 2-methyl-2-butanol, 2-methyl-2-pentanol, 2,3-dimethyl-2-butanol, 2,3-dimethyl-2,3-butanediol, 2,4-dimethyl-2,4-pentanediol, 2,4-dimethyl-2,4-hexanediol, 2,5-dimethyl-hexan-2,5-diol, 3-hydroxy-3-methyl-2-butanone, 4-hydroxy-4-methyl-2-pentanone (diacetone alcohol) and combinations thereof. In the provided methods, when a microporous layer is desired, the microporous fluid may be simultaneously applied with other coating solutions (such as the electrode ink fluid) onto a gas diffusion media layer.

The microporous layer formed after drying the microporous fluid may comprise, in some examples, about 50%-90% of carbon particles, and about 10%-45% of hydrophobic polymer. The microporous layer may be between 2 μm and 100 μm thick, and in some examples between 10 μm and 70 μm thick. The porosity of the microporous layer can suitably be greater than 50%, and in some examples, greater than 70%. The pore sizes in the microporous layer may cover a wide range, such as from 5 nm to 10 μm.

Dry Composite Structure

The provided methods of the present disclosure further comprise forming a dry composite structure by drying the reinforced wet composite structure. Drying may be achieved by passing the wet composite structure through one or more dryers to dry the substrate coatings by solvent removal, thereby forming a coated substrate. The dryer or series of dryers may include infrared dryers, infrared lamps, hot-air dryers, or other dryers suitable for drying multiple coating solution layers. One of skill will appreciate, however, that other methods of drying and removing solvent, including air drying, are also contemplated. A dry composite structure formed by the provided methods comprises a substrate, an electrode formed on the substrate, and a laminated membrane formed on the electrode. In some embodiments, the dry composite structure comprises an ePTFE-laminated monolayer or multi-layer membrane.

In some embodiments, the substrate of the dry composite structure may be gas diffusion media or other permanent substrate used in forming a MEA. However, in some embodiments, the substrate may be a temporary substrate, such as a decal substrate. A decal substrate is a chemically stable, flat, smooth nonporous substrate to which coatings may be applied, but such coatings are subsequently removed from the decal substrate. Accordingly, a decal substrate is not used in forming a MEA. Rather, once the dry composite structure formed, the laminate (the component layers) are then separated from the substrate by peeling or other methods of removal. The removed laminate may then be combined with other MEA components. Accordingly, in some embodiments, the provided methods comprise removing the dry composite structure from a temporary substrate, applying the removed composite structure to a permanent support and hot pressing or otherwise bonding the composite structure with the permanent support.

Membrane Electrode Assembly

In some of the various embodiments of the present disclosure, also provided are methods of manufacturing a membrane electrode assembly (MEA) having laminated membranes. In one example of such methods, a cathode substrate (for example, a GDM) can be formed by manufacturing a laminated membrane (such as an ePTFE-laminated membrane) in accordance with the present disclosure, wherein the catalyst ink fluid is a cathode ink. The cathode substrate formed can then be assembled with an anode substrate to form a membrane electrode assembly. The anode substrate used can, but is not required to, comprise a laminated membrane (such as an ePTFE-laminated membrane) manufactured in accordance with the present disclosure, wherein the catalyst ink fluid is an anode ink. In another example of the provided methods, an anode substrate (for example, a GDM) can be formed by manufacturing a laminated membrane (such as an ePTFE-laminated membrane) in accordance with the present disclosure, wherein the catalyst ink fluid is an anode ink. The anode substrate formed can then be assembled with a cathode substrate to form a membrane electrode assembly. The cathode substrate used can, but is not required to, comprise a laminated membrane (such as an ePTFE-laminated membrane) manufactured in accordance with the present disclosure, wherein the catalyst ink fluid is a cathode ink. In either example, the MEA is created by hot pressing or otherwise binding the two coated substrates, along with other desired components (such as subgasket or backing layer) to form an MEA. The pressure and time for the hot press may vary for different MEAs formed. Good results have been achieved with temperature of 295° F., time of 2 minutes, and force of 4000 lbs.

In use, a MEA assembled according to the present methods is typically sandwiched between two electrically conductive plates. Such plates are typically made of a carbon composite, metal, or plated metal material and serve to, among other things, distribute reactant or product fluids to and from the MEA electrode surfaces. Such distribution is typically achieved through one or more fluid-conducting channels engraved, milled, molded or stamped in the plate surface(s) facing the MEA(s). These channels are sometimes designated a "flow field." In some embodiments, the plate may be a "bipolar plate" that distributes fluids to and from two consecutive MEAs in a stack, with one face directing fuel to the anode of the first MEA while the other face directs oxidant to the cathode of the next MEA (and removes product water). In some embodiments, the plate may be a "monopolar plate" that distributes fluids to or from an MEA on only one side.

The methods of manufacturing laminated membranes, MEAs, or both, described herein may be used to provide processing improvements in one or more of cost, performance, durability, and manufacturing efficiency. The simultaneous coating of components can improve manufacturing efficiency and reduce manufacturing costs by reducing the number of passes through a coating machine. In addition, component costs may also be reduced through use of component precursors (fluids), which are generally less expensive than pre-formed components (such as a pre-formed membrane). Yield improvements may also be realized since fewer passes through a coating machine reduce the likelihood of additive process defects and reduced start-up and shut down waste. There may additionally be improvements in durability and/or performance when the layers are applied directly to the substrate simultaneously resulting in a more intimate and tightly bound interface between the layers. Also, there may be a cost advantage to coating the functional layers simultaneously, which can result in a reduced amount of raw materials required to meet performance requirements. Finally, because the rate of imbibement of a reinforcement layer can be increased through the provided methods, one of skill will appreciate that manufacturing efficiency can improved accordingly.

Referring to FIG. 1, an exemplary method 100 of simultaneously applying two coatings under laminar flow to a substrate is depicted. On the surface of a substrate 110, a first membrane fluid 120 is simultaneously applied with a second membrane fluid 130 using a coating die 140. The coating fluids 120, 130 are applied such that the second membrane fluid 130 is coated onto the first membrane fluid 120. After application of the fluids 120, 130, the substrate 110 is shown passing through a dryer 160 (or a series of dryers) to dry the coating fluids by solvent removal, thereby forming a coated substrate 170. Prior to the substrate 110 passing through a dryer 160, a reinforcement layer 150 (for example, ePTFE) may be added to provide additional support to the structure.

Figure 2:
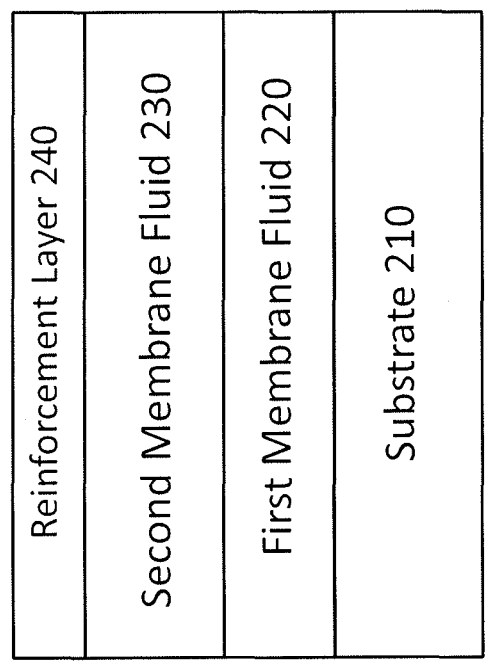
FIG. 2 depicts a cross-sectional view of an exemplary 2-layer fuel cell component formed according to the process of FIG. 1.

As further shown in FIG. 2, a laminated membrane (such as an ePTFE-laminated membrane) prepared according to the provided methods may, in some embodiments, comprise a substrate 210, a first membrane fluid layer 220 formed thereon, and a second membrane fluid layer 230 formed on the first membrane layer 220, and a reinforcement layer 240 formed on the second membrane layer 230.

EXAMPLES

The described embodiments will be better understood by reference to the following examples which are offered by way of illustration and which one of skill in the art will recognize are not meant to be limiting.

Example 1

Comparative Example

Cathode ink was prepared by adding 11.69 g of a 30% Pt-alloy catalyst (supplied by Tanaka Kikinzoku International) and 1080 g of 5 mm spherical zirconia milling media to a first 500 ml polyethylene bottle. In a second 250 ml polyethylene bottle, 13.02 g of a 900 equivalent weight (EW) ionomer (28 wt % solids, 42 wt % ethanol, 30 wt % water) and 5.79 g of a 700 EW ionomer (20.5 wt % solids, 79.5 wt % water) were added, along with 64.8 g of ethanol, 38.52 g of water and 1.16 g of a 26.7 wt % oleylamine, 55 wt % n-propanol and 18.3 wt % water solution, and the contents were stirred for about 15 minutes. The ionomer solution from the second bottle was then added to the catalyst and milling media in the first bottle. The first bottle was then placed on a ball mill and rotated at 145 RPMs for 72 hrs.

A non-porous membrane solution was prepared by adding 38.76 g of a 650 EW ionomer dispersion (20.4 wt % solids, 47.8 wt % water and 31.8% ethanol), 28.79 g of ethanol and 9.44 g of water to a 125 ml polyethylene bottle and allowed to mix overnight.

On the surface of a piece of GDM (supplied by Freudenberg FCCT KG), the non-porous membrane solution and cathode ink were simultaneously coated under laminar flow onto the GDM substrate such that the non-porous membrane layer was coated on the cathode ink layer to form a wet composite structure. The wet film thickness of the cathode ink layer was 89 microns, and has a Pt loading of 0.2 mg/cm$^2$. The wet film thickness of the membrane layer was 160 microns, and had a dry thickness of about 7-9 microns. After the 2 layers were coated and before any substantial drying, a piece of ePTFE (Donaldson D1326) was placed on the wet membrane surface. After applying the ePTFE, the wet composite structure was then allowed to sit until the membrane solution was fully imbibed into the ePTFE. Full imbibement is understood to have occurred when the white ePTFE turns completely clear, indicating that all the air has been displaced by membrane solution. This process required 75 seconds. The wet composite structure was then dried under an infrared lamp with a source temperature of 450° F. for about 10 minutes to form a dry composite structure having a substrate, a cathode formed on the substrate, and a non-porous membrane formed on the cathode.

Example 2

To demonstrate that the provided methods can improve manufacturability, as compared to Example 1, cathode ink fluid was prepared by adding 11.69 g of a 30% Pt-alloy catalyst (supplied by Tanaka Kikinzoku International) and 1080 g of 5 mm spherical zirconia milling media to a first 500 ml polyethylene bottle. In a second 250 ml polyethylene bottle, 13.02 g of a 900 equivalent weight (EW) ionomer (28 wt % solids, 42 wt % ethanol, 30 wt % water) and 5.79 g of a 700 EW ionomer (20.5 wt % solids, 79.5 wt % water) were added, along with 64.8 g of ethanol, 38.52 g of water and 1.16 g of a 26.7 wt % oleylamine, 55 wt % n-propanol and 18.3 wt % water solution, and the contents were stirred for about 15 minutes. The ionomer solution from the second bottle was then added to the catalyst and milling media in the first bottle. The first bottle was then placed on a ball mill and rotated at 145 RPMs for 72 hrs to form the catalyst ink fluid.

A first non-porous membrane fluid was prepared by adding 78.92 g of a 650 EW ionomer dispersion (20.4 wt % solids, 47.8 wt % water and 31.8% ethanol), 34.21 g of ethanol and 1.87 g of water to a 250 ml polyethylene bottle and allowed to mix overnight.

A second non-porous membrane fluid was prepared by adding 38.24 g of a 650 EW ionomer dispersion (20.4 wt % solids, 47.8 wt % water and 31.8% ethanol), 24.49 g of ethanol, 30.62 g of water and 36.66 g of n-propanol to a 250 ml polyethylene bottle and allowed to mix overnight.

On the surface of a piece of GDM (supplied by Freudenberg FCCT KG), the non-porous membrane fluids and cathode ink fluid were simultaneously coated under laminar flow onto the GDM substrate such that the second non-porous membrane fluid was coated onto the first non-porous membrane fluid. These two layers were placed on the cathode ink fluid layer to form a three layer, wet composite structure. The wet film thickness of the cathode ink layer was 89 μm, and had a Pt loading of 0.2 mg/cm². The wet film thickness of the first membrane layer was 28 μm, and had a dry thickness of about 2 μm. The wet film thickness of the second membrane layer was 201 μm, and had a dry thickness of about 6 μm. After the three layers were coated and before any substantial drying, a piece of ePTFE (Donaldson D1326) was placed on the wet membrane surface (second membrane layer). After applying the ePTFE, the wet composite structure was then allowed to sit until the membrane solution was fully imbibed into the ePTFE. In contrast with Example 1, full imbibement only took 15 seconds, thereby demonstrating improved manufacturing efficiency. The wet composite structure was then dried under an infrared lamp with a source temperature of 450° F. for about 10 minutes to form a dry composite structure having a substrate, a cathode formed on the substrate, and a non-porous membrane formed on the cathode.

Figure 3A:
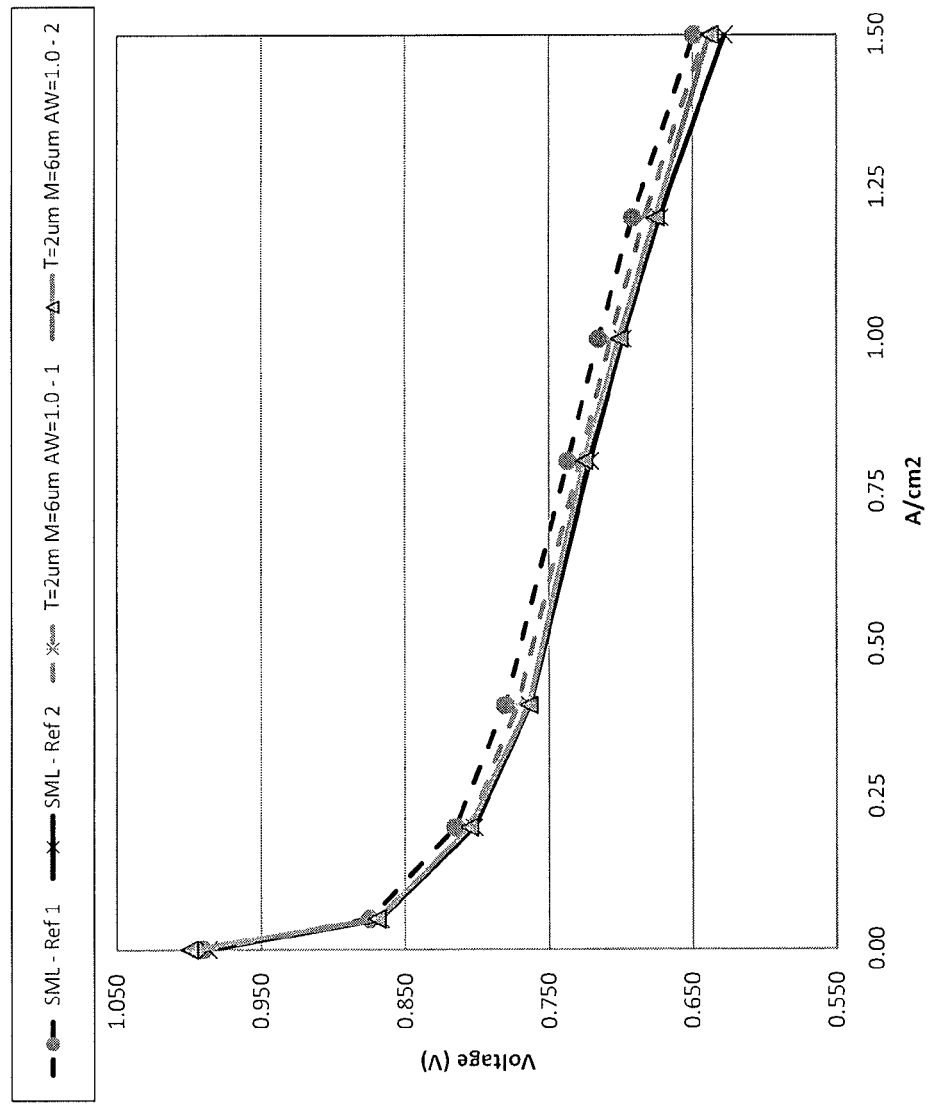
FIG. 3A illustrates operation of a fuel cell under "normal" (FCPM) conditions using two membrane electrodes (SML) prepared according to conventional methods (with full imbibement time of 75 seconds) and two exemplary membrane electrodes prepared according to the methods described herein (with full imbibement time of 15 seconds); and 3B illustrates operation of said fuel cell under "wet" conditions. The graphs demonstrate that no performance reduction occurs with the membrane electrodes prepared using the provided methods. As used herein, "FCPM" means 80° C., 32% relative humidity$_{(inlet)}$, and 150 kPa$_{(abs)}$; "wet" means 80° C., 100% relative humidity$_{(inlet)}$ and 170 kPa$_{(abs)}$; and "AW" means alcohol:water mass ratio.
Figure 3B:
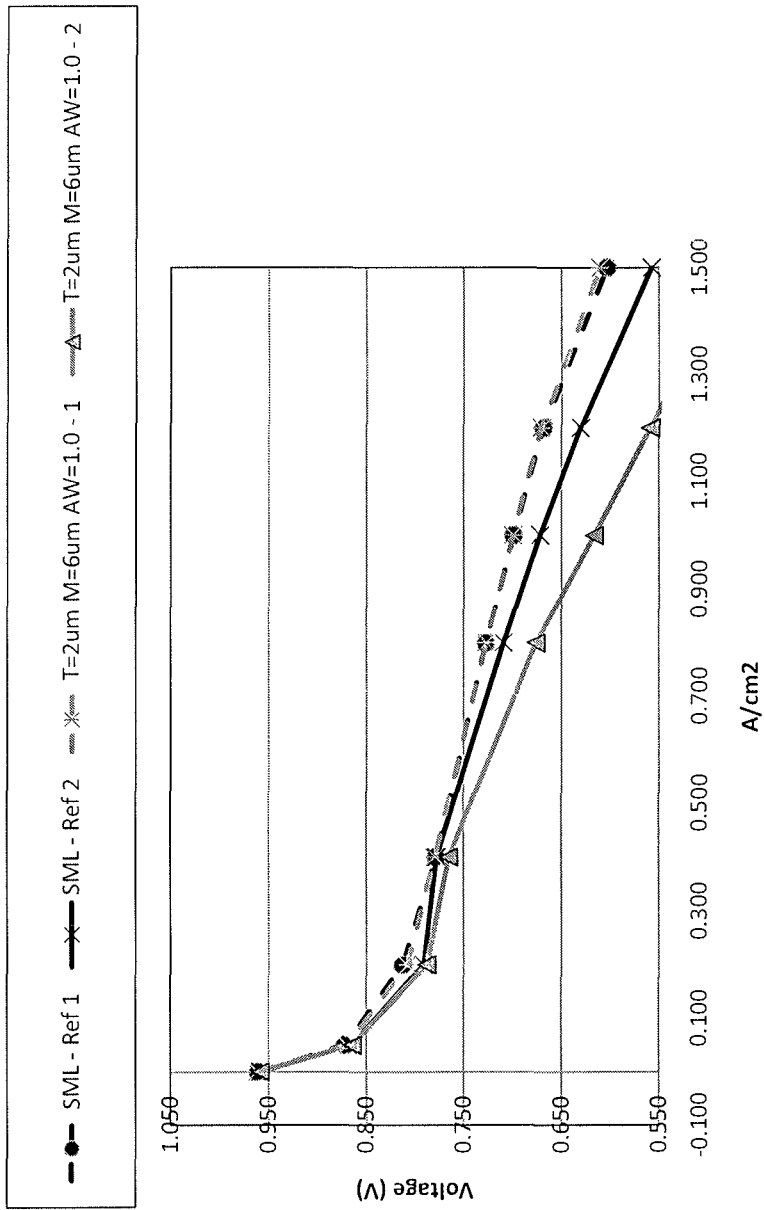
Figure 4B:
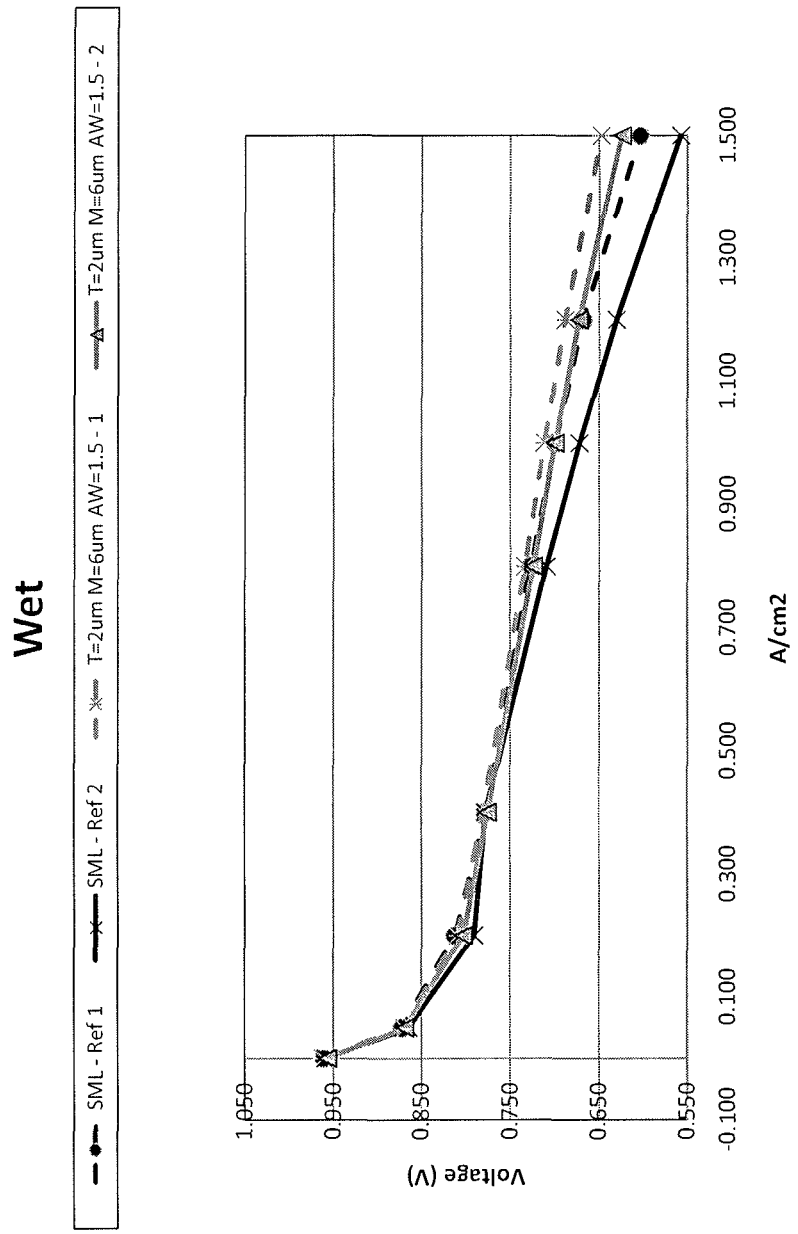
FIG. 4A illustrates operation of a fuel cell under "normal" (FCPM) conditions using two membrane electrodes (SML) prepared according to conventional methods (with full imbibement time of 75 seconds) and two additional exemplary membrane electrodes prepared according to the methods described herein (with full imbibement time of 15 seconds); and 4B illustrates operation of said fuel cell under "wet" conditions. The graphs again demonstrate that no performance reduction occurs with the membrane electrodes prepared using the provided methods. As used herein, "FCPM" means 80° C., 32% relative humidity$_{(inlet)}$, and 150 kPa$_{(abs)}$; "wet" means 80° C., 100% relative humidity$_{(inlet)}$ and 170 kPa$_{(abs)}$; and "AW" means alcohol:water mass ratio.

Two membranes prepared according to these methods [(T=2 μm; M=6 μm; AW=1.0-1) and (T=2 μm; M=6 μm; AW=1.5-2)] were compared under FCPM and wet conditions to convention membranes (SML-Ref 1 and SML-Ref 2) prepared according to conventional methods. FIGS. 3 and 4 illustrate that a reduction in performance does not occur using the inventive membranes.

Example 3

To demonstrate that the provided methods are applicable to both cathode and anode electrodes, an anode ink fluid was prepared by adding 6.62 g of a 20% Pt of graphitized Vulcan catalyst (supplied by Tanaka Kikinzoku International) and 520 g of 5 mm spherical zirconia milling media were added to a first 250 ml polyethylene bottle. In a second 250 ml polyethylene bottle, 22.53 g of a 900 equivalent weight (EW) ionomer (28 wt % solids, 42 wt % ethanol, 30 wt % water), 20.75 g of ethanol, 13.72 g of water and 1.39 grams of a 26.7 wt % oleylamine, 55 wt % n-propanol and 18.3 wt % water solution were added and the contents stirred for 15 minutes. The ionomer solution from the second bottle was then added to the catalyst and milling media in the first bottle. The first bottle was then placed on a ball mill and rotated at 125 RPMs for 72 hrs.

A first non-porous membrane fluid was prepared by adding 78.92 g of a 650 EW ionomer dispersion (20.4 wt % solids, 47.8 wt % water and 31.8% ethanol), 34.21 g of ethanol and 1.87 g of water to a 250 ml polyethylene bottle and allowed to mix overnight.

A second non-porous membrane fluid was prepared by adding 38.24 g of a 650 EW ionomer dispersion (20.4 wt % solids, 47.8 wt % water and 31.8% ethanol), 24.49 g of ethanol, 30.62 g of water and 36.66 g of n-propanol to a 250 ml polyethylene bottle and allowed to mix overnight.

On the surface of a piece of GDM (supplied by Freudenburg FCCT KG), the non-porous membrane solution and anode ink were simultaneously coated under laminar flow onto the GDM substrate such that the non-porous membrane layer was coated on the anode ink layer to form a wet composite structure. The wet film thickness of the anode ink layer was 25 microns, and had a Pt loading of 0.05 mg/cm². The wet film thickness of the membrane was 160 microns, and has a dry thickness of about 7-9 microns. After the three layers were coated and before any substantial drying, a piece of ePTFE (Donaldson D1326) was placed on the wet membrane surface (second membrane layer). After applying the ePTFE, the wet composite structure was then allowed to sit until the membrane solution was fully imbibed into the ePTFE (15 seconds). The wet composite structure was then placed under an infrared lamp with a source temperature of 450° F. for about 10 minutes to form a dry composite structure having a substrate, an anode formed on the substrate, and a non-porous membrane formed on the anode.

Example 4

To illustrate certain embodiments of the present disclosure, the following methods are also contemplated.

Cathode ink fluid may be prepared by adding 11.69 g of a 30% Pt-alloy catalyst (such as that supplied by Tanaka Kikinzoku International) and 1080 g of 5 mm spherical zirconia milling media to a first 500 ml polyethylene bottle. In a second 250 ml polyethylene bottle, 13.02 g of a 900 equivalent weight (EW) ionomer (28 wt % solids, 42 wt % ethanol, 30 wt % water) and 5.79 g of a 700 EW ionomer (20.5 wt % solids, 79.5 wt % water) may be added, along with 64.8 g of ethanol, 38.52 g of water and 1.16 g of a 26.7 wt % oleylamine, 55 wt % n-propanol and 18.3 wt % water solution, and the contents stirred for about 15 minutes. The ionomer solution from the second bottle may be added to the catalyst and milling media in the first bottle. The first bottle may then be placed on a ball mill and rotated at 145 RPMs for 72 hrs to form the catalyst ink fluid.

A first non-porous membrane fluid may be prepared by adding 78.92 g of a 650 EW ionomer dispersion (20.4 wt % solids, 47.8 wt % water and 31.8% ethanol), 34.21 g of ethanol and 1.87 g of water to a 250 ml polyethylene bottle and allowed to mix overnight.

A second membrane fluid may be selected to be n-propanol.

On the surface of a piece of GDM (such as that supplied by Freudenberg FCCT KG), the membrane fluids and cathode ink fluid may be simultaneously coated under laminar flow onto the GDM substrate such that the second membrane fluid is coated onto the first non-porous membrane fluid, and these two layers placed onto the cathode ink fluid layer to form a three layer, wet composite structure. The wet film thickness of the cathode ink layer may be 89 µm, and have a Pt loading of 0.2 mg/cm$^2$. The wet film thickness of the first membrane layer may be 100 µm, and have a dry thickness of about 7-9 µm. The wet film thickness of the second membrane layer (n-propanol) may be approximately 25 µm. Upon drying, said layer will have no dry thickness. After the three layers are coated, and before any substantial drying, a piece of ePTFE (such as Donaldson D1326) may be placed on the wet membrane surface (second membrane layer). After applying the ePTFE, the wet composite structure may be allowed to sit until full imbibement of the ePTFE occurs. In contrast with Example 2, full imbibement should only take 15 seconds. The wet composite structure may then be dried under an infrared lamp to form a dry composite structure having a substrate, a cathode formed on the substrate, and a non-porous membrane formed on the cathode.

The present disclosure should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A method of manufacturing expanded polytetrafluoroethylene (ePTFE) laminated membranes, comprising:
   providing a porous or non-porous substrate;
   providing a catalyst ink fluid;
   providing a first membrane fluid;
   providing a second membrane fluid;
   forming a wet composite structure by simultaneously coating the catalyst ink fluid, first membrane fluid, and second membrane fluid onto the substrate under laminar flow such that the catalyst ink fluid is coated onto the substrate, the first membrane fluid is coated onto the catalyst ink fluid, and the second membrane fluid is coated onto the first membrane fluid; and
   applying an ePTFE-reinforcement layer to the second membrane fluid and maintaining the
      reinforced wet composite structure at conditions allowing for full imbibement of the reinforcement layer.

2. The method of claim 1, comprising drying the reinforced wet composite structure to form a dry composite structure having a substrate, an electrode formed on the substrate, and a non-porous ePTFE laminated membrane formed on the electrode.

3. The method of claim 1, wherein the substrate is gas diffusion media.

4. The method of claim 1, wherein the catalyst ink fluid comprises at least one catalyst, at least one solvent, and at least one ionomer.

5. The method of claim 1, wherein the first membrane fluid comprises (i) at least one solvent selected from water, water-miscible organic solvent, and mixtures thereof; and (ii) at least one polymer electrolyte.

6. The method of claim 5, wherein the polymer electrolyte of the first membrane fluid is selected from tetrafluoroethylene polymers, fluorinated acid-functional monomers, tetrafluoroethylenefluorvinyl ether polymer, perfluorosulfonic acids, perfluorocyclobutanes, hydrocarbon polymers, sulfonated polyether ketones, aryl ketones, acid-doped polybenzimidazoles, sulfonated polysulfone, sulfonated polystyrene, and combinations thereof.

7. The method of claim 1, wherein the second membrane fluid consists of 1-propanol, 2-propanol, or combinations thereof.

8. The method of claim 1, wherein the second membrane fluid comprises (i) at least one solvent selected from water, water-miscible organic solvent, and mixtures thereof; (ii) at least one polymer electrolyte; and (iii) at least one alcohol selected from 1-propanol, and 2-propanol.

9. The method of claim 8, wherein the polymer electrolyte of the second membrane fluid is selected from tetrafluoroethylene polymers, fluorinated acid-functional monomers, tetrafluoroethylenefluorvinyl ether polymer, perfluorosulfonic acids, perfluorocyclobutanes, hydrocarbon polymers, sulfonated polyether ketones, aryl ketones, acid-doped polybenzimidazoles, sulfonated polysulfone, sulfonated polystyrene, and combinations thereof.

10. A method of manufacturing expanded polytetrafluoroethylene (ePTFE) laminated membranes, comprising:
    providing a porous or non-porous substrate;
    providing a catalyst ink fluid;
    providing a first membrane fluid comprising (i) at least one solvent selected from water, water-miscible organic solvent, and mixtures thereof; and (ii) at least one polymer electrolyte;
    providing a second membrane fluid, wherein said fluid (i) consists of 1-propanol, 2-propanol, or
       combinations thereof; or (ii) comprises (a) at least one solvent selected from water, water-miscible organic solvent, and mixtures thereof; (b) at least one polymer electrolyte; and (c) at least one alcohol selected from 1-propanol and 2-propanol;
    forming a wet composite structure by simultaneously coating the electrode ink fluid, first membrane fluid, and second membrane fluid onto the substrate under laminar flow such that the catalyst ink fluid is coated onto the substrate, the first membrane fluid is coated onto the catalyst ink fluid, and the second membrane fluid is coated onto the first membrane fluid; and
    applying an ePTFE reinforcement layer to the second membrane fluid and maintaining the
       reinforced wet composite structure at conditions allowing for full imbibement of the reinforcement layer.

11. The method of claim 10, comprising drying the reinforced wet composite structure to form a dry composite structure having a substrate, an electrode formed on the substrate, and a non-porous ePTFE-laminated membrane formed on the electrode.

12. The method of claim 10, wherein the substrate is gas diffusion media.

13. The method of claim 10, wherein the catalyst ink fluid comprises at least one catalyst, at least one solvent, and at least one ionomer.

14. The method of claim 10, wherein any polymer electrolytes used in the first and second membrane fluids are independently selected from tetrafluoroethylene polymers, fluorinated acid-functional monomers, tetrafluoroethylenefluorvinyl ether polymer, perfluorosulfonic acids, perfluorocyclobutanes, hydrocarbon polymers, sulfonated polyether ketones, aryl ketones, acid-doped polybenzimidazoles, sulfonated polysulfone, sulfonated polystyrene, and combinations thereof.

15. The method of claim 10, wherein the second membrane fluid consists of 1-propanol.

\* \* \* \* \*